Figure 1:
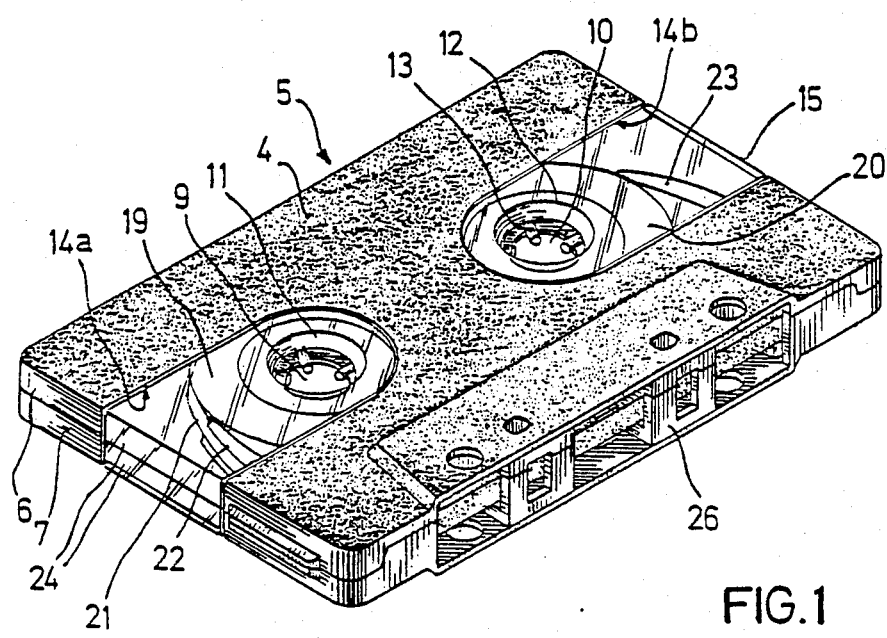

United States Patent [19]

Buerkle et al.

[11] Patent Number: 4,530,475
[45] Date of Patent: Jul. 23, 1985

[54] MAGNETIC TAPE CASSETTE WITH WINDOWS

[75] Inventors: Ottmar Buerkle, Offenburg; Kurt Schmidts, Kehl, both of Fed. Rep. of Germany; Alfred Schneider, Hoenheim, France; Walter Schuett, Kehl, Fed. Rep. of Germany

[73] Assignee: Basf Aktiengesellschaft, Ludwigshafen, Fed. Rep. of Germany

[21] Appl. No.: 629,128

[22] Filed: Jul. 9, 1984

Related U.S. Application Data

[63] Continuation of Ser. No. 410,839, Aug. 23, 1982, abandoned.

[30] Foreign Application Priority Data

Aug. 26, 1981 [DE] Fed. Rep. of Germany ... 8124876[U]

[51] Int. Cl.³ ............................ G03B 1/04; G11B 15/32
[52] U.S. Cl. ..................................... 242/199; 360/132
[58] Field of Search ........................ 242/192, 197–200; 360/93, 96.1, 96.4, 132; 352/72 R, 78; 206/387; 220/41 B; D14/11

[56] References Cited

U.S. PATENT DOCUMENTS

| D. 263,585 | 3/1982 | Doodson | D14/11 |
|---|---|---|---|
| D. 271,392 | 10/1983 | Sumisha et al. | D14/11 |
| 4,166,593 | 9/1979 | Milants | 242/199 |
| 4,227,622 | 10/1980 | Okamura et al. | 220/4 B |
| 4,363,456 | 12/1982 | Goto | 242/197 |

FOREIGN PATENT DOCUMENTS 2512254 3/1983 France ................. 242/199

*Primary Examiner*—Leonard D. Christian
*Attorney, Agent, or Firm*—Keil & Weinkauf

[57] ABSTRACT

A tape cassette, particularly a magnetic tape cassette, has two or more windows which are separated from one another by a separator housing member and which are located on a common carrier which may consist, for example, of connecting webs between the windows. The window arrangement is useful in standardized cassettes, for example compact cassettes, as well as in all other film, sound, video and data cassettes.

15 Claims, 5 Drawing Figures

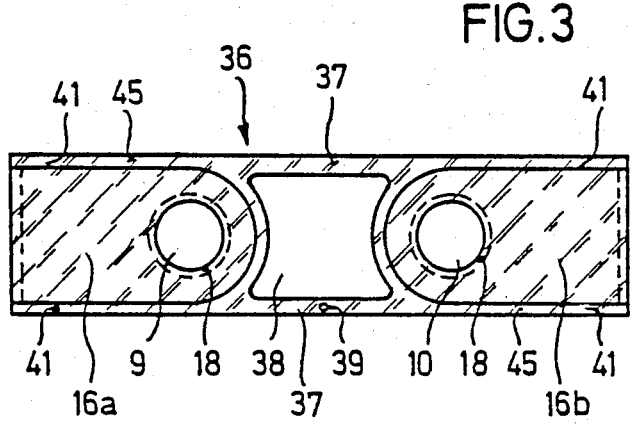
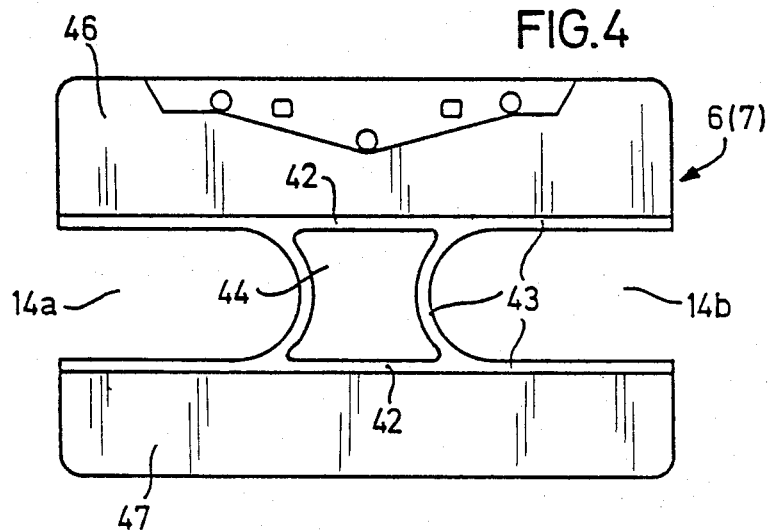

MAGNETIC TAPE CASSETTE WITH WINDOWS

This is a continuation of application Ser. No. 06/410,839, filed Aug. 23, 1982 and now abandoned.

The present invention relates to a tape cassette, in particular a magnetic tape cassette, with one or more hub or reel for the tape and a cassette housing, surrounding these, which possesses windows which are formed by apertures in the housing and transparent members which cover these apertures, and to a window arrangement for such a cassette.

Magnetic tape cassettes, in particular compact cassettes, having, in plan view, one window located between the apertures which receive the winding spindles of the apparatus have been disclosed, for example, in German utility model No. 76 37,787 and U.S. Pat. Nos. 2,988,295 and 3,565,367. In these cassettes, only the middle portion of the tape roll is visible from the outside. On the other hand, U.S. Pat. No. 3,074,841 discloses an elongate rectangular window extending over the apertures which the drive spindles enter.

Completely transparent cassette housings are also known, but these are considered to be of unattractive design.

It is an object of the present invention to provide a tape cassette, particularly a magnetic tape cassette, whose interior is more visible, without the housing having to be made completely transparent. It is a further object of the invention to provide a window arrangement which is suitable for mass production and is easily fitted into the cassette housing.

We have found that the first object is achieved by a tape cassette, especially a magnetic tape cassette, which has one or more windows formed by an aperture in a largely rectangular cassette housing and a transparent member covering this aperture, if there are at least two windows separated by a separator housing member and located on a common carrier. This makes it simple to provide more than one window, at points of the housing remote from one another, without having to bear additional assembly costs.

We have found that the second object is achieved by a window arrangement wherein two windows are joined to one another by webs acting as carriers.

This permits not only inexpensive construction in one piece, but also an arrangement of the windows in the cassette housing which virtually does not change the inner walls and inner members of the cassette, so that the dimensions and functioning of the cassette are not adversely affected and are indeed, if anything, improved.

In a further development of the novel cassette, the housing member carrying the windows can possess apertures and recessess for the windows and carrier. Consequently, the windows and carriers can be in the same plane as the inner walls of the housing, or lower than these.

Moreover, the recesses can be provided at the edge of the apertures of the housing and/or on the separator housing member, thus providing a solution to positioning and sealing problems.

Further, it is advantageous to construct one or more of the windows with a passage for a hub. On the other hand, the carrier can also be constructed with one or more passages for one or more spindles.

Advantageously, the carrier for the windows can consist of narrow webs which define a hole. As a result, the amount of material required can be kept low, whilst yet providing adequate mechanical strength of the housing and of the window carrier arrangement, even in automated manufacture.

Advantageously, the gate mark of the molding is located on one of the webs, so that tolerances resulting from the process are distributed symmetrically over the windows.

The recesses on the housing are advantageously narrow grooves corresponding to the webs and running parallel to the transverse face of the cassette, for accurate location of the windows relative to the spindles.

In practice, the hole between the webs is also delimited, on the other two sides, by fixing edges, thereby giving a firm and tight construction in the center portion of the cassette.

The construction of the novel window arrangement can be further improved if the webs and/or the windows possess locating faces for correct positioning on the housing of the cassette, thereby achieving very reliable assembly of the cassette, even if this assembly is automated.

Advantageously, each window has a passage for a spindle and a bearing collar for a hub. This makes the window arrangement a very important part of the cassette housing, which substantially contributes to the quality of the finished cassette, since not only the position of the guide faces for the tape and tape roll but also the tolerances of the hub and tape roll positioning, and the spindle and hub tolerances, are determined solely by how accurate the window arrangement is and how accurately it is fitted into the housing. To achieve a good seal, fixing edges are provided, at least at the periphery, preferably on the long sides of the window arrangement.

The description of an embodiment of the invention, shown in the drawing, will explain the invention in detail.

Figure 2A:
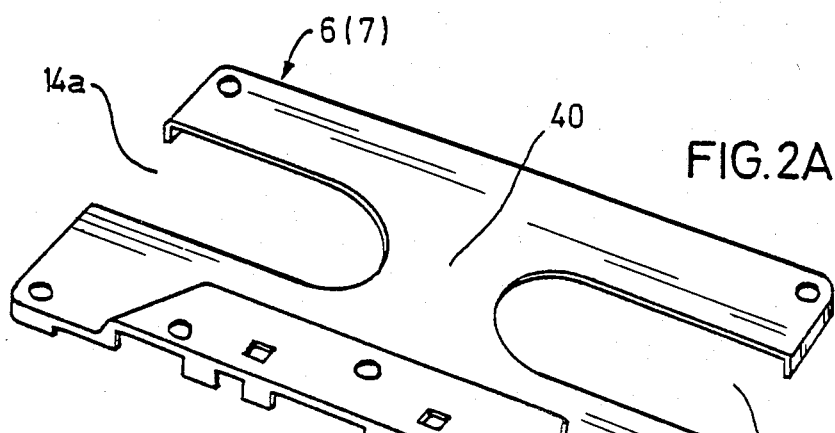
Figure 2B:
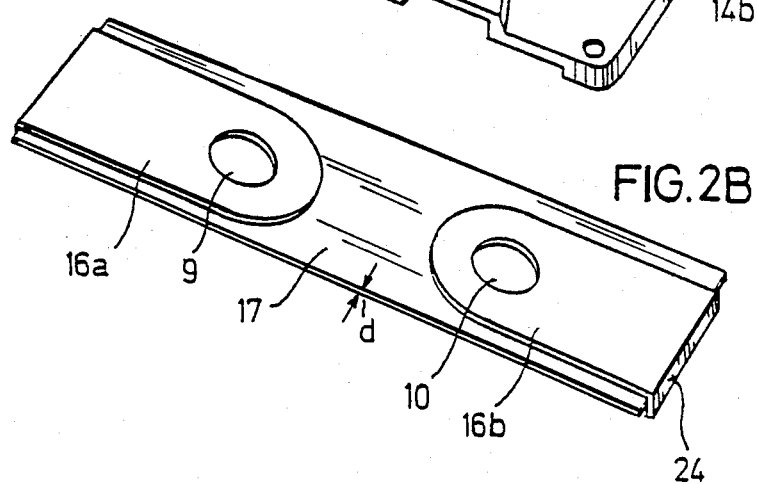

In the drawing,

FIG. 1 shows a compact cassette, with two horizontal windows on the top face, in perspective, FIG. 2A shows the upper part of the housing of the cassette of FIG. 1, FIG. 2B shows a first window arrangement with a plate-shaped carrier, FIG. 3 shows a second window arrangement with webs as the carrier and FIG. 4 shows a housing member, without windows, in plan view from within A compact cassette 5 comprises essentially the housing 4, with upper and lower parts 6 and 7, which are connected by, for example, screws. Apertures or passages 9 and 10 allow passage of the spindles of the apparatus. Behind the passages 9 and 10 are the hubs 11 and 12, whose drive pegs 13 for the spindles are also visible. Two identical window apertures 14a and 14b are provided on the connecting axis of the centers of the passages 9 and 10.

The inner edges of the apertures 14a and 14b are semicircles, of diameters roughly corresponding to the external diameters of the hubs 11 and 12. The diameter can however also be smaller or larger than these. Accordingly, with the housing 4 opaque and in a darker color, the hubs 11 and 12, which are mostly lighter in color, appear to be mounted in a fork-shaped holder. The window apertures 14a and 14b extend linearly to the outer edges 15 of the housing, in the embodiment shown the short sides of the substantially rectangular housing. The shape and arrangement of the window apertures 14 is optional as long as the strengths demanded of magnetic tape cassettes is preserved; this can be achieved by appropriate choice of the material of construction. The window apertures 14a and 14b are covered by transparent members 16a and 16b which form the actual windows. In FIG. 1B, the members 16a and 16b are located on a common plate-shaped carrier 17 and can be manufactured in one piece therewith. The transparent members and carrier are hereafter referred to conjointly as the "window arrangement".

The transparent members 16 are provided with edge portions 24, bent upwards at a right angle and having a height corresponding, for example, to half the height of the narrow sides of the housing 4, so that after assembly of two housing members 6 and 7, having identical window arrangements, the standard cassette side height results. Tape rolls 19 and 20, a magnetic tape 21 and tape guide levers 22 and 23 are provided in the cassette 5.

Bearing collars or rings 18 (not visible in FIG. 2B) for the hubs 11 and 12 are provided around the passages 9 and 10 of the windows (see FIG. 3). As shown in FIG. 2B, a carrier 17 has a thickness d, and the cassette internal dimensions are reduced by twice this thickness. In cassettes where only these internal dimensions matter, a corresponding change in the external dimensions, whilst keeping the wall thickness the same, is readily possible.

However, in compact cassettes the external dimensions are also standardized, and therefore cannot be changed. On the other hand, for a given material of construction, a reduction in wall thickness of the cassette by an amount corresponding to the thickness d can substantially detract from the strength of the cassette. It is possible to reduce the thickness of d to, for example, film thickness, and, in compensation, transport and handling of the two windows jointly is attainable. The windows can be fixed to such a film in a suitable manner, for example by means of a self adhesive film, by adhesion forces or by electrostatic attraction.

FIG. 3 shows a further advantageous embodiment of the window arrangement 36, wherein the carrier for the windows 16a and 16b essentially consists of webs 37. These webs 37 have, for example a thickness of 0.7 mm and a width of 2.9 mm and consist of the same material as the windows 16, for example polystyrene. Between the webs 37 and the end portions of the windows 16a and 16b there is a hole 38. The webs 37 are sufficiently strong to impart adequate flexural strength to the window arrangement, so that the latter can, after having been produced, automatically be taken out of the mold and threaded up, preferably utilising the hole 38, on magazine rods. In the process of manufacture, advantageously by injection molding, the gate mark 39 is advantageously on one of the webs 37, so that the tolerances, resulting from the method of manufacture, can be distributed from the center of the arrangement in both directions, giving symmetrical conditions for the two windows 16a and 16b. During assembly, the gate mark 39 advantageously faces the inner wall of the housing, avoiding an objectionable bump in the middle of the cassette. The ejection points 41 of the arrangement 36 from the injection mold are advantageously in the vicinity of the free ends of the windows 16a and 16b.

In the central member or separator member 40 of the housing 4, the grooves 42 are provided as recesses corresponding to the webs 37, and advantageously run parallel to the front face 36 of the cassette. Fixing edges 43 are provided on the peripheries of the apertures 14a and 14b of each housing member, 6 and 7 respectively, the depth of which, like that of the grooves 42, corresponds roughly to the thickness d of the webs 37.

Corresponding to the shape of the hole 38, a positioning protrusion 44 is provided in the center of each housing member 6 and 7, so as to permit accurately fitting insertion of the window arrangement 36. The shape of the hole 38 and protrusion 44 is that of a rectangle with pushed-in sides. The relatively long sides of the rectangle provide positioning faces for the corresponding locating faces of the webs 37 and windows 16a and 16b.

Fixing edges 45 on the arrangement 36 correspond to the fixing edges 43 on the housing member 6 or 7. The window arrangement 36 is fixed in a suitable manner, for example, by welding, giving a good seal between the housing member 6 or 7 and the said window arrangement. In the interior of the member 6 or 7, there results, after assembly, a plane surface on the same level, consisting of the inner part-faces of the protrusion 44, the windows 16a and 16b and the housing inner walls 46 and 47. This ensures that the housing inner walls still serve to guide the tape and tape roll in spite of the insertion of large windows.

The requisite high flexural strength of the housing parts 6 and 7 before being assembled with the window arrangement is also ensured by suitable choice of the material of construction and design of the "wasp-waist" (separator housing member 40) of the parts of the housing. The parts 6 and 7 can be either partially transparent or completely opaque, depending on the materials used.

As a modification of what has been described above, it is also possible to let the most important guiding characteristics of the cassette walls be predominantly performed by the window arrangement 36, through appropriate choice of the thickness of the webs 37 and 41 and of the window members 16a and 16b, and by producing the webs 37, 41, and the window surfaces, with great precision. By providing the passages 9 and 10 in the window members 16a and 16b respectively and providing bearing collars 18 around these passages a further improvement in cassette quality is feasible, and this is again achievable by very accurate production of a central member, namely the common window arrangement, for each part of the housing. Other embodiments of window arrangements are also conceivable, for example by providing several windows, arranged in a radial pattern around the passages 9 or 10, with corresponding radial webs as carrier members. In a window arrangement according to the invention it is basically not important what the shape and arrangement in the cassette housing is, provided the windows are at a distance from one another and the windows encompass one or more transparent or opaque separator housing members. We claim:

1. A tape cassette, especially a magnetic tape cassette, comprising a cassette housing having upper and lower parts and at least one hub or reel contained therein, and windows which are formed by apertures in at least one of said parts of the housing and transparent members covering the said apertures, wherein said cassette comprises at least two windows each covered by one of said transparent members, a common carrier carrying said at least two transparent members adjacent opposite ends of said carrier, and a housing separator member disposed in said housing part between said windows, said common carrier consisting of webs which connect the said at least two transparent members, and wherein the at least one housing part, in which the windows are formed, is provided at its inner surface with recesses for the correct positioning of said webs and said transparent members.

2. A tape cassette as claimed in claim 1, wherein the webs are provided with locating faces for the correct positioning on the relevant housing part of the cassette.

3. A tape cassette according to claim 1, wherein the recesses are grooves corresponding to the webs and substantially running in parallel to the front face of the cassette.

4. A tape cassette as claimed in claim 1, wherein the housing separator member has recesses for the webs.

5. A tape cassette as claimed in claim 1, wherein the webs are narrow and arranged at a distance from one another and delimit a hole.

6. A tape cassette as claimed in claim 1, wherein the housing separator member has a protrusion, the shape of which corresponds to the hole, and which has fixing edges delimiting said protrusion on two sides.

7. A tape cassette as claimed in claim 1, wherein each of said at least two transparent members is provided with an edge portion bent upwards at 90° and forms part of the side wall of the cassette housing.

8. A tape cassette as claimed in claim 1, wherein the webs together with the at least two transparent members are an injection molding and a gate mark is located on one of the webs.

9. A tape cassette, especially a magnetic tape cassette, comprising a cassette housing having upper and lower parts and at least one hub or reel contained therein, and windows which are formed by apertures in at least one of said parts of the housing and transparent members covering the said apertures, wherein said cassette comprises at least two windows each covered by one of said transparent members, a common carrier carrying said at least two transparent members adjacent opposite ends of said carrier, and a housing separator member disposed in said housing part between said windows, said common carrier consisting of webs which connect the said at least two transparent members, and wherein the at least one housing part, in which the windows are formed, is provided at its inner surface with recesses for the correct positioning of said webs and said transparent members, and wherein faces, pointing into the interior of the cassette, of said transparent members, protrude relative to the corresponding housing inner wall and form guide faces at least for the tape roll(s).

10. A tape cassette as claimed in claim 9, wherein each housing part comprises two windows consisting of two transparent members and webs connecting said transparent members to each other, and wherein each two transparent members which are located opposite one another form said guide faces for the tape rolls.

11. A window arrangement for a tape cassette, especially a magnetic tape cassette, said cassette comprising a housing part having at least two apertures and also having recesses, and said cassette further comprising at least two transparent members for covering said apertures, and comprising webs which connect and form a common carrier, distinct from said housing part, for said transparent members, said webs corresponding to the recesses in said housing part of the cassette so as to insure a correct positioning of said webs and said transparent members relatively to said housing part.

12. An arrangement as claimed in claim 11, wherein said webs have a thickness less than the thickness of the housing parts of the cassette and said transparent members have a thickness substantially the same as the thickness of the walls of the housing parts.

13. An arrangement as claimed in claim 11, wherein said webs are narrow and are arranged at a distance from one another and delimit a hole.

14. An arrangement as claimed in claim 11, wherein each transparent member has an edge portion bent upwards at 90° for forming part of the side wall of the cassette housing when assembled with the cassette housing.

15. An arrangement as claimed in claim 11, wherein the webs together with the at least two transparent members are an injection molding and a gate mark is located on one of the webs.

* * * * *